United States Patent
Huang et al.

(10) Patent No.: US 6,243,786 B1
(45) Date of Patent: Jun. 5, 2001

(54) APPARATUS AND METHOD FOR GENERATING AN INTERRUPT PROHIBITED ZONE IN PIPELINED DATA PROCESSORS

(75) Inventors: Tzi Ting Huang, Yuong-Her; Shisheng Shang, Kaohsiung, both of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/219,993

(22) Filed: Dec. 23, 1998

(51) Int. Cl.[7] ..................................................... G06F 13/24
(52) U.S. Cl. .......................... 710/262; 710/260; 710/261; 710/48; 710/49; 712/40; 712/244; 712/245
(58) Field of Search .................................. 712/40, 23, 228, 712/230, 234, 236, 244, 245; 710/260, 261, 262, 263, 264, 265, 266, 267, 268, 269, 47, 48, 49, 50

(56) References Cited

U.S. PATENT DOCUMENTS 5,481,683 * 1/1996 Karim ................................... 712/217
5,764,971 * 6/1998 Shang et al. ........................ 712/244

* cited by examiner

Primary Examiner—Eddie Chan
Assistant Examiner—Mackly Monestime
(74) Attorney, Agent, or Firm—Proskauer Rose, LLP

(57) ABSTRACT

In a preferred embodiment of the present invention an a method whereby a pipelined data processor with an embedded microinstruction sequencer can give special consideration to the interrupt of the microinstructions translated from a macroinstruction using two control bit data, accelerate the reaction time to interrupts, and expand the time frame within which to process interrupts while maintaining a precise interrupt. When a macroinstruction is decoded into microinstructions at the decoder stage in a pipelined data processor, a control bit called the atomic bit provides the system with the information about the boundary of the precise interrupt, and another control bit called the LOCK bit decides when an external interrupt can be processed and masks an interrupt when the system state does not allow any interrupt to be processed.

8 Claims, 13 Drawing Sheets

[#n] : CONTENT OF REGISTER n
[#m] = [#n] : MOVE CONTENT OF REGISTER n TO REGISTER m
[#n] = a : ASSIGN A VALUE OF a TO REGISTER n

FIG. 7C

| STAGE \ TIME | $T_1$ | $T_2$ | $T_3$ | $T_4$ | $T_5$ | $T_6$ | $T_7$ | $T_8$ |
|---|---|---|---|---|---|---|---|---|
| IF | $I_2$ | $I_2$ | $I_2$ | $I_2$ | $I_2$ | $I_3$ | $I_3$ | $I_3$ |
| DI | $I_1$ | $I_1$ | $I_1$ | $I_1$ | $I_1$ | $I_2$ | $I_2$ | $I_2$ |
| EX |  | $I_{1,1}$ | $I_{1,2}$ | $I_{1,3}$ | $I_{1,4}$ | $I_{1,5}$ |  |  |
| MA |  |  | $I_{1,1}$ | $I_{1,2}$ | $I_{1,3}$ | $I_{1,4}$ | $I_{1,5}$ |  |
| WB |  |  |  | $I_{1,1}$ | $I_{1,2}$ | $I_{1,3}$ | $I_{1,4}$ | $I_{1,5}$ |

A MICROINSTRUCTION THAT DOESN'T CHANGE CONTROL FLOW

APPARATUS AND METHOD FOR GENERATING AN INTERRUPT PROHIBITED ZONE IN PIPELINED DATA PROCESSORS

FIELD OF THE INVENTION

The present invention relates generally to pipelined data processors and more particularly, it relates to a pipelined data processor having an embedded microinstruction sequencer for maintaining a precise interrupt.

BACKGROUND OF THE INVENTION

In the past, conventional computer architectures utilized a sequential program execution model, whereby an architectural program counter sequenced instructions in a FIFO (first-in-first-out) scheme. In other words, a current instruction would be completed prior to beginning the next instruction. However, as computer processing speed became an important issue, computer architectures began using pipelined execution models. A pipelined data processor permits several instructions to be transmitted to the processor simultaneously or in an overlapping manner.

However, the use of a sequential model and a pipelined model may conflict with one another. For example, a pipelined instruction may modify the process state in a different order than that defined by the sequential model. When such a conflict occurs, a so-called "interrupt" has taken place. In short, an interrupt is an event that changes the normal flow of program execution. Typically, when an interrupt occurs, the processor briefly stops the currently executing process to tend to the interrupt. Once the interrupt is handled (often by an interrupt handler, such as a software application), the original process continues by retrieving state information regarding the interrupt process that has been saved. Such information that is saved includes program counter information that defines which instructions of the interrupted process have completed execution.

In regard to the pipelining process of a processor, it can generally be divided into five stages: instruction fetch (IF), instruction decode and operand fetch (DI), instruction execution (EX), memory access (MA) and write back (WB). If some instructions require multiple sub-instructions or "microinstructions" to implement, then a microinstruction sequencer is required. An instruction composed of one or more limited number of microinstructions is called a "macroinstruction." For example, when a macroinstruction $I_i$ is read from the instruction fetch stage, it is decoded into microinstructions $I_{i,1}, \ldots, I_{i,z}$ (where z is an integer, and $z \geq 1$) by the microinstruction sequencer at the DI stage before it continues to the subsequent stages. When an internal exception (an interrupt that is caused by an instruction) or an external interrupt (an interrupt not caused by a specific instruction but by external sources) occurs, there are several conventional methods to ensure a "precise interrupt." However, such conventional methods have several shortcomings, as will be described below.

A precise interrupt, as opposed to imprecise, are utilized to essentially guarantee that the original process continues after the interrupt is handled (assuming that such interrupt in non-catastrophic). According to the definition of a precise interrupt in "Implementing Precise Interrupts in Pipelined Processors" of James E. Smith et al. (IEEE Trans. on Computers, Vol. 32, No. 5, May 1988), an interrupt is precise if the following criteria are met:

1. All instructions, before the instruction indicated by the program counter, have completed execution and have modified the process state (information relevant to a process) correctly,
2. All instructions, after the instruction indicated by the program counter, have yet to execute and have not modified the process state, and
3. The program counter information points to an instruction (that caused the interrupt) that is completely executed or completely non-executed.

For example, according to the definition of a precise interrupt in "Implementing Precise Interrupts in Pipelined Processors" of James E. Smith et al. (IEEE Trans. on Computers, Vol. 32, No. 5, May 1988), when an exception or interrupt occurs, instructions before interrupt instruction $I_i$ of the program counter (PC) are stored by the system and must be completed. Thereafter, the subsequent instructions must be discarded. Furthermore, the state of the system must be recovered to that of a completed instruction before $I_i$ or that of the completed $I_i$.

The above notwithstanding, for some macroinstructions, there are certain points existing between its microinstructions. When an exception or an interrupt occurs at these points, it is still possible to define the state of the system, such that the exception or the interrupt can be processed at these points, called segmented points, and a precise interrupt may be maintained. For example, REP MOVS M1 M2 is a repetitive instruction, which uses a counter for repetition. It repeatedly executes the memory move instructions (MOVS M1 M2) to move the data referred to by M1 to the memory position referred to by M2 until the counter reaches a defined value and the next macroinstruction is executed. When an interrupt or an exception is processed between memory moves, the program counter (PC) value of the macroinstruction is stored and the interrupt service routine is executed. At this point in time, the system is in the state of having finished the memory move, and the counter maintains the number of moves to be repeated. When the interrupt service routine is executed to its completion, the same macroinstruction will re-execute to continue with the memory moves that are to be repeated in accordance with the counter. In fact, in this particular example, the interrupt and the exception between the memory moves can be processed without affecting the precise interrupt. Thus, the segmented points are positioned between the memory moves while maintaining the precise interrupt.

For a pipelined data processor with a sequencer, when the macroinstruction is translated into multiple microinstructions, a non-microinstruction pipelined data processing method will be used if there is no option available for processing the microinstruction. When an interrupt or an exception occurs, the macroinstruction $I_i$ is translated into multiple microinstructions $I_{i,1}$–$I_{i,z}$. Assumably, if some of the microinstructions have already changed the state of the system, it is necessary to let $I_i$ be executed to its completion in order to maintain the precise interrupt. In other words, the interrupt must be processed after $I_i$. The system stores the PC value of the next instruction $I_{i+1}$ and maintains the state of the completed $I_i$. This is shown in FIG. 1, where $I_{i-1}$, $I_i$, $I_{i+1}$, $I_{i+2}$, $I_{i+3}$, $I_{i+4}$, and $I_{i+5}$ are macroinstructions, $I_i$ has been translated into four microinstructions $I_{i,1}$–$I_{i,4}$, and the remaining macroinstructions are translated into a single microinstruction. $I_i$ is decoded at the DI stage to become $I_{i,1}$–$I_{i,4}$. When an external interrupt occurs at $T_7$, the system must delay the processing of this external interrupt until $T_{10}$, i.e., after microinstruction $I_{i,4}$ has completed the WB stage, in order to ensure that the system is in the state of the completed $I_i$ when the interrupt occurs. With this method, however, it is impossible to process an interrupt or an exception in real time. The situation further deteriorates if the macroinstruction is composed of a long string of microinstructions.

It is therefore an object of the present invention to overcome the disadvantages of the prior art by providing a pipelined data processor that utilizes two control bits to accelerate the reaction time to interrupts, while maintaining a precise interrupt.

SUMMARY OF THE INVENTION

These and other objects are achieved by the present invention. The present invention provides a method whereby an interrupt prohibited zone is defined for translating a macroinstruction into microinstructions in a pipelined data processor. The inventive method processes microinstructions so that the system can support a precise interrupt, even when the macroinstruction is being translated into microinstructions. At the same time, the inventive method provides more flexibility to the system as it reacts to interrupts. One feature of the present invention is the introduction of two control bits at the DI stage, called an atomic bit and a LOCK bit, respectively. The atomic bit indicates the beginning address of the first microinstruction and the segment point of each macroinstruction which enables the system to know the boundary of the precise interrupt, so that the system can decide at what time to process the state. At the same time, the atomic bit can also provide knowledge to the system about the state of the boundary when an exception or interrupt occurs. The LOCK bit, on the other hand, informs the system of which microinstructions must be executed without interruption, so that the system can restrict the interrupt when the system is in an unrecoverable state or when the interrupt needs to be masked as demanded by the design of the microinstruction programmer.

When the system encounters an interrupt or an exception, the system can still process the microinstruction interrupt or exception using these two control bits, providing greater flexibility in the system. More particularly, these two control bits enable the system to understand the state of the boundary of the precise interrupt, and, with the introduction of the method to restrict interrupts, the system can process any interrupt regardless of whether the system is in a reversible or an unrecoverable state. If the system is in a reversible state, it can immediately process the interrupt or exception and return to the completed boundary state of the last macroinstruction; if the system is in an unrecoverable state or an inappropriate state, the processing of the interrupt will be delayed until the macroinstruction boundary, defined by the precise interrupt is complete. The present invention not only supports precise interrupts but also accelerates the speed of processing the macroinstruction interrupt or exception.

BRIEF DESCRIPTION OF THE DRAWINGS

The following detailed description, given by way of example and not intended to limit the present invention solely thereto, will best be understood in conjunction with the accompanying drawings, where similar elements will be represented by the same reference symbol, in which:

FIG. 7(a) illustrates the effects on a register when a macro instruction is executed in accordance with the present invention;

FIG. 7(b) illustrates the behavior of the microinstructions of the macroinstruction of FIG. 7(a) in accordance with the present invention;

FIG. 7(c) illustrates a chart showing the processing of 5 microinstructions of a macroinstruction in relation to time/stage in accordance with the present invention;

DETAILED DESCRIPTION OF THE INVENTION

The present invention uses two control bits, an atomic bit data and an LOCK bit data, to define an interrupt prohibited zone for microinstructions. The atomic bit data provides the system with the information about each macroinstruction. Specifically, it defines the boundary of the precise interrupt and information about the location of segment points, both being necessary information to support precise interrupt. On the other hand, the LOCK bit data provides the system with the information about when external interrupt is not allowed, as decided by the nature of the instruction itself or by the state of the system. When the LOCK bit data does allow an external interrupt to be processed, the interrupt or exception processing mechanism will utilize the precise interrupt boundary information defined by the atomic bit data to perform the action of restoring the system. When the LOCK bit data does not allow the external interrupt to be processed, the interrupt or exception mechanism will delay the processing until the next precise interrupt boundary. Thus, these two control bits constitute the whole method of defining the interrupt prohibited zone.

The precise interrupt, according to the present invention, not only applies to the extent defined in the Smith et al. article, but can also exist at the segment points as discussed in the prior art. Therefore, the boundary of the precise interrupt can be between macroinstructions or at segment points of a macroinstruction.

The following will discuss the operations of the atomic bit data and the LOCK bit data in the present invention.

Figure 1:
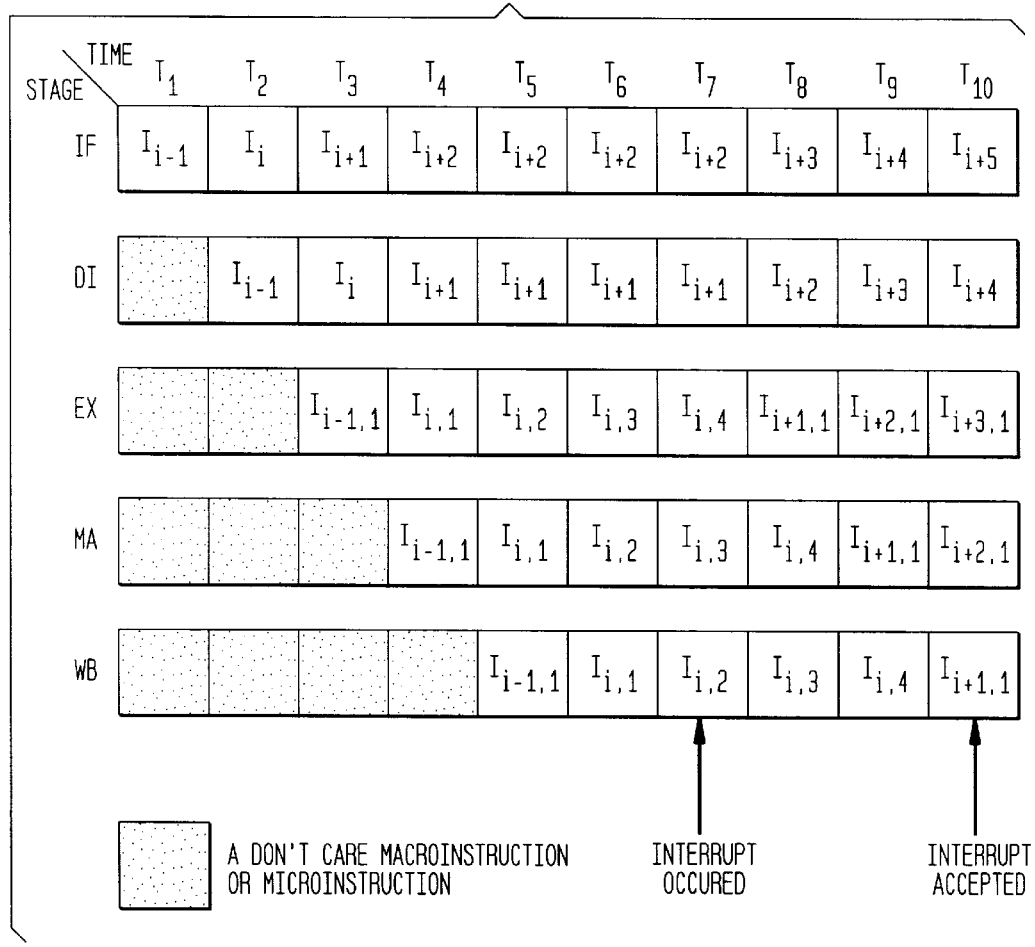
FIG. 1 illustrates a chart showing microinstructions in relation to time/stage in a conventional pipeline system.
Figure 2:
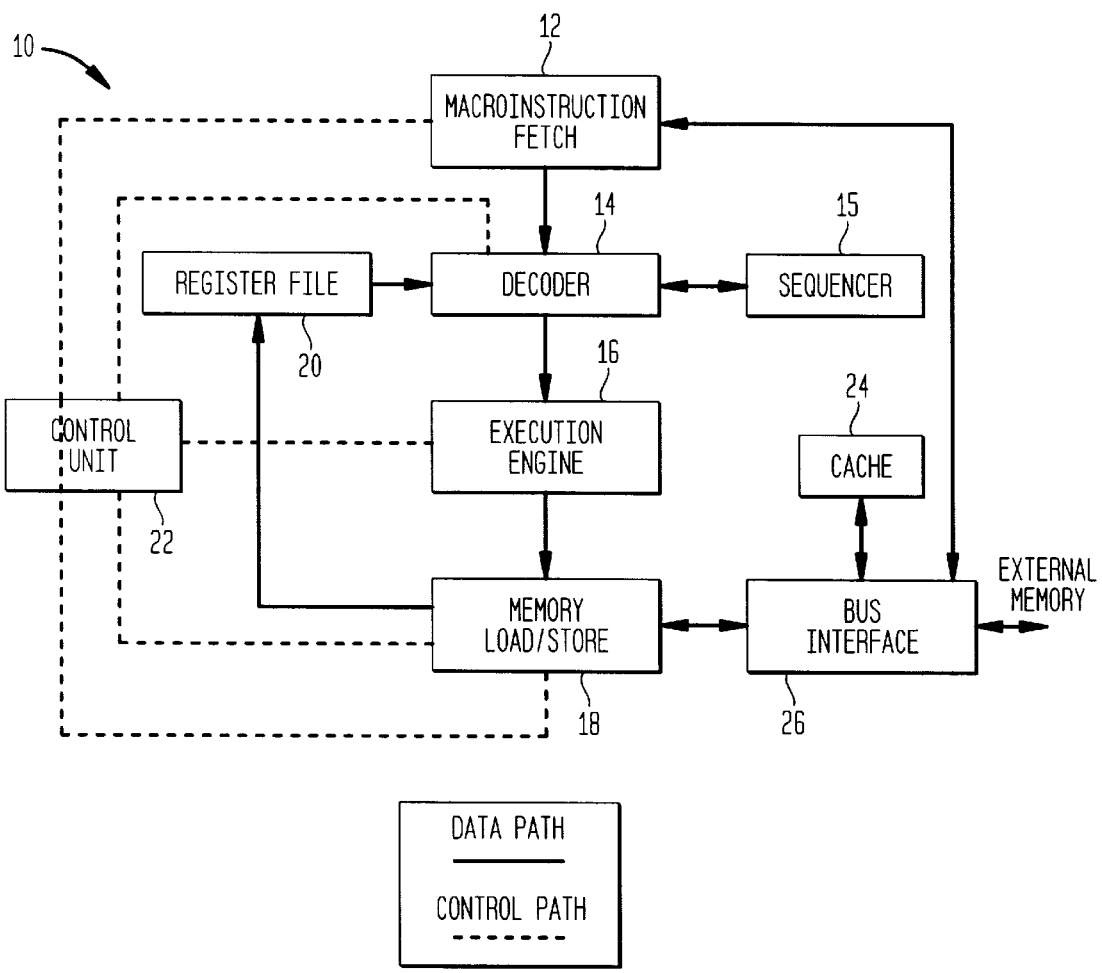
FIG. 2 schematically illustrates a pipelined data processor model that may be utilized in accordance with the present invention.

A pipelined data processor model 10 that may be utilized in the present invention is shown in FIG. 2. As shown, there are five pipelining stages in this pipelined data processor model, namely, the macroinstruction fetch (IF), the macroinstruction decode and operand fetch (DI), the microinstruction execution (EX), the memory access (MA), and the write back (WB). When the macroinstruction is composed of more than one microinstruction, there is a sequencer 15 at the DI stage to perform the translation operation.

A microinstruction fetch circuit 12, during the macroinstruction fetch stage, is responsible for fetching the macroinstructions for the processor to execute. Depending on whether or not the processor 10 has an embedded RAM, the macroinstructions can be fetched from an external memory unit or from an internal RAM. The macroinstructions fetched are sent to a decoder 14 in the DI stage in sequence or in groups, where they are decoded and converted to one or more than one microinstructions through sequencer 15, while an operand is fetched from register file 20, if necessary. Register file 20 is a file that the processor 10 uses to temporarily store the result of a computation. During the WB stage, the processor will return the result to the register file when necessary. The microinstructions generated at this stage are sent to execution engine 16, in the EX stage, for execution and are further sent to memory load/store 18, in the MA stage for memory access when necessary. The object of the access may be the external memory unit or the internal RAM depending on whether or not processor 10 has an embedded RAM. Control unit 22 of the processor is responsible for controlling the pipelining operation and the processing operation of the interrupt or exception. As for the processing of the interrupt or exception during the MA stage in the pipelining process, the operation is controlled by control unit 22 as well.

The configuration and the operation of the first control bit, i.e. the atomic bit data will now be described. Hereinabove, it was explained that the atomic bit data provides the boundary of the precise interrupt, such that the system can utilize the atomic bit data to store the state of the boundary. Thus, when an interrupt or an exception occurs, the system can recover the boundary state of the precise interrupt using the stored atomic bit data.

For example, when macroinstruction Ii is read from the IF stage, and reaches the DI stage during the next cycle, the sequencer will decode it as $I_{i,1}, I_{i,2} \ldots I_{i,z}$, with $z \geq 1$, and the microinstruction Iij ($1 \leq j \leq z$) of the atomic bit is defined as follows:

atomic bit of $I_{ij}=1$, when $I_{ij}$ is the first microinstruction or a segment point of the macroinstruction;

atomic bit of $I_{ij}=0$, otherwise  (1)

Figure 3:
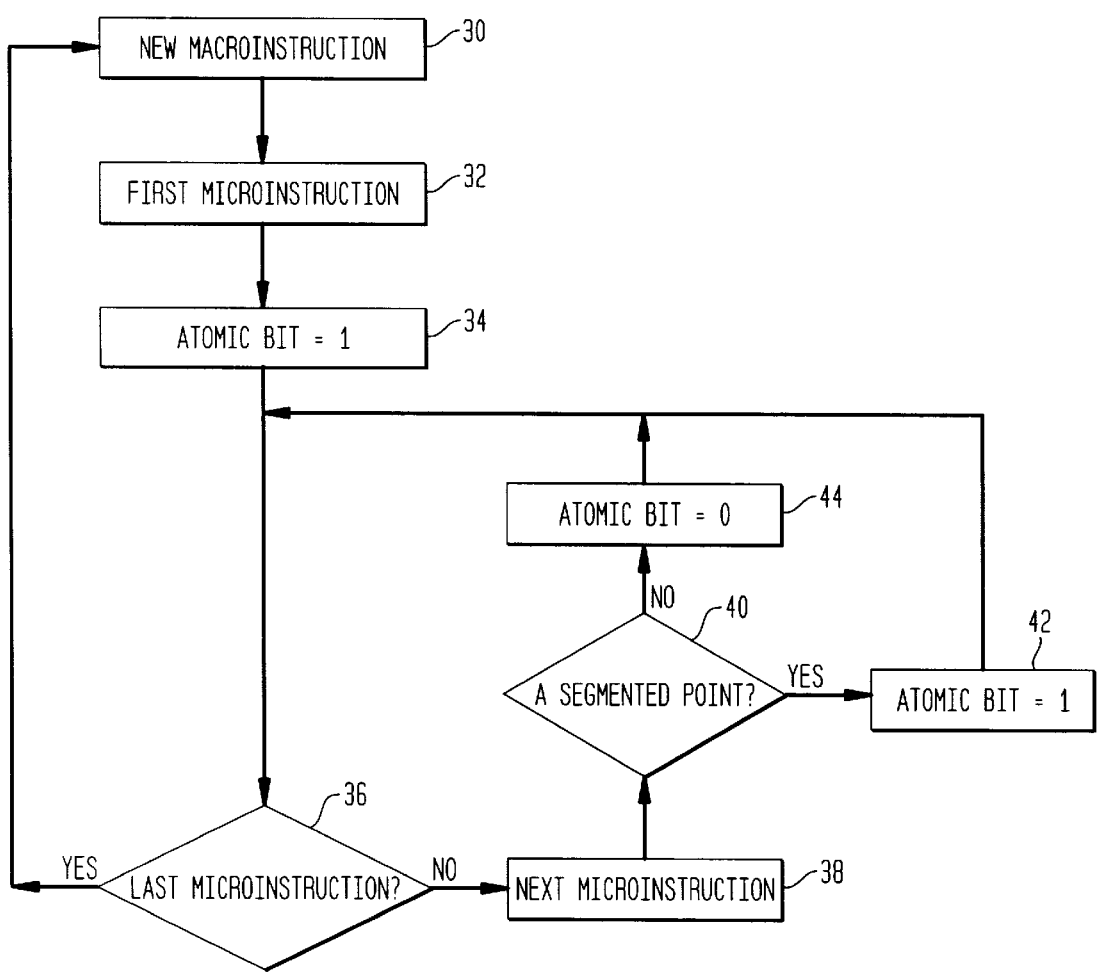
FIG. 3 is a flowchart defining atomic bit data in accordance with the present invention.

FIG. 3 is the flow chart of the atomic bit definition. At step 30, a new macroinstruction is fetched by macroinstruction fetch 12. At step 32, decoder 14 decodes and converts the macroinstruction into one or more microinstructions. At the first microinstruction, I is set at binary one (the atomic bit data=1). This occurs at step 34. At step 36, it is ascertained whether the current microinstruction is the last (or only) one in the current macroinstruction. If the microinstruction is the last one, the process begins again at step 30. However, if there are additional microinstructions, the next microinstruction is decoded at step 38, and at step 40, it is ascertained whether there is a segmented point between the now current microinstruction and the previous microinstruction. If yes, then $I_{ij}$ is set at binary one. Conversely, if no, then $I_{ij}$ is set at binary zero. In either event, the process continues back to step 36.

Figure 4:
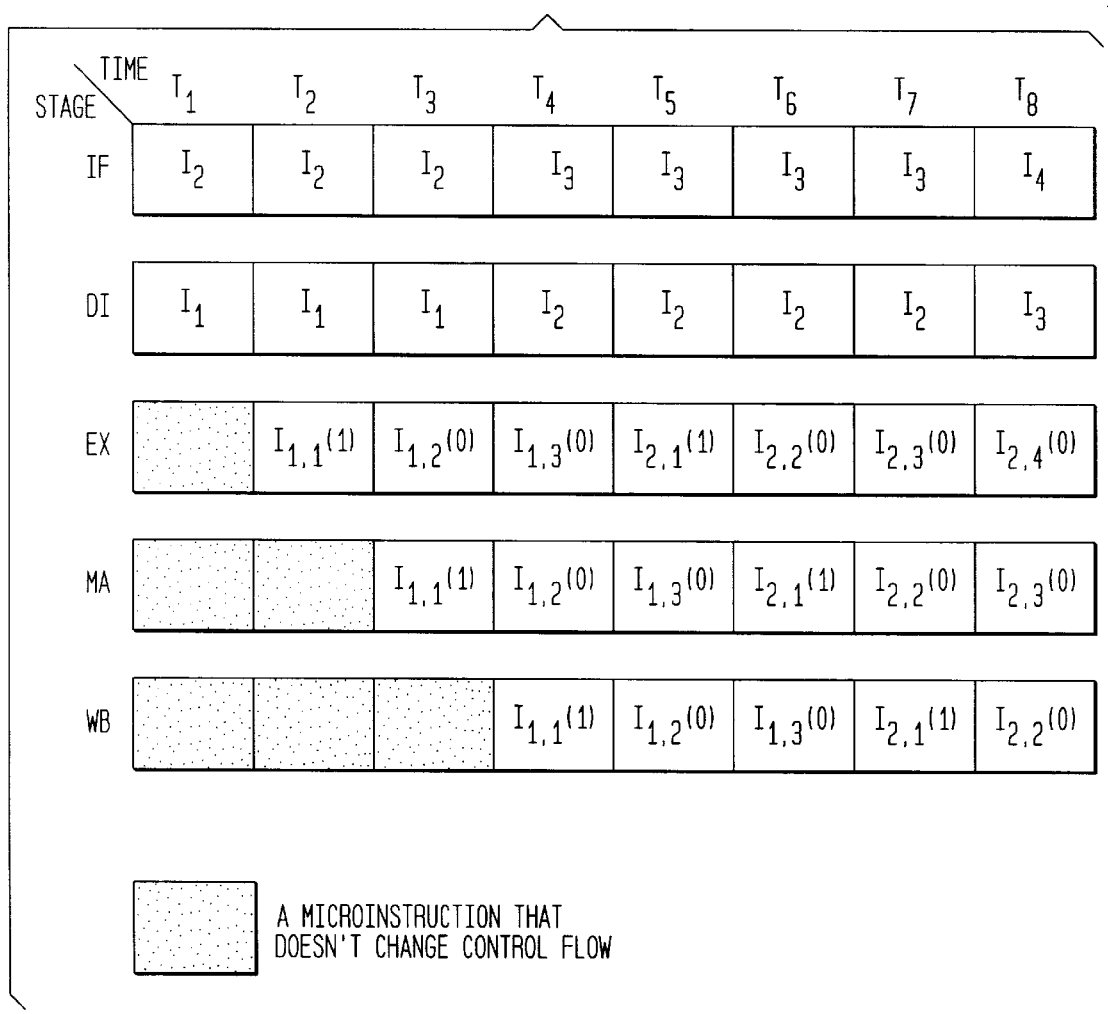
FIG. 4 illustrates a chart showing microinstruction and atomic bit data in relation to time/stage in accordance with the present invention.

As shown in FIG. 4, macroinstruction $I_1$ is illustratively decoded into three microinstructions $I_{1,1}$, $I_{1,2}$, and $I_{1,3}$, and macroinstruction $I_2$ is illustratively decoded into four microinstructions $I_{2,1}$, $I_{2,2}$, $I_{2,3}$ and $I_{2,4}$ where the value in the bracket indicates the definition of the atomic bit of the microinstruction. At $T_1$, macroinstruction $I_1$ enters the DI stage; at $T_2$, $I_{1,1}$ enters the EX stage, and its atomic bit is 1. At $T_3$, $I_{1,2}$ enters the EX stage, and its atomic bit is 0. At $T_5$, the first microinstruction of $I_2$, ($I_{2,1}$) enters the EX stage, and its atomic bit is defined as 1. At $T_6$, $I_{2,2}$ enters the EX stage, and its atomic bit is 0. The atomic bits of other microinstructions are all defined according to equation (1) above.

Since the atomic bit data defines the boundary of the precise interrupt, the system can utilize the feature of the atomic bit data to determine the state of the macroinstruction during pipeline processing and make certain adjustment accordingly. For instance, the atomic bit data can store the system state of the previous macroinstruction or segment point and recover it when there is an occurrence of an interrupt or an exception.

The function of the atomic bit of a microinstruction in executing the macroinstruction can be illustrated with the following example. In this example, a level 5 pipelined processor is used. The microinstruction can assumably change the system state at the EX stage and the atomic bit data can be used at the EX stage to recover the system state. Furthermore, when the system state is to be recovered, it is recovered to that of the boundary of the precise interrupt. The interrupt or exception is processed at the MA stage. When an interrupt or exception is to be processed, the system will store the program counter (PC) value of either the current macroinstruction to which the microinstruction at the MA stage belongs or of the subsequent macroinstruction (depending on whether the fault or the trap method, as is known in the art, is used when the macroinstruction encounters an interrupt or an exception). In this example, it is assumed that the PC value of the macroinstruction is stored before an interrupt service routine is executed.

Figure 5:
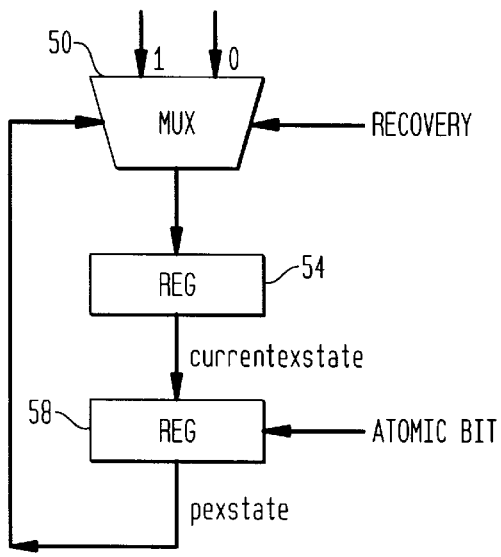
FIG. 5 schematically illustrates a recovery device utilized in the instruction execution state in accordance with the present invention.

FIG. 5 illustrates a recovering device at the EX stage which includes a multiplexer 50, a register 54 for storing the current state after execution (CURRENTEXSTATE) and a register 58 for storing the previous state after execution (PEXSTATE). Under normal conditions, RECOVERY is 0; the multiplexer stores the system state after the EX execution to the CURRENTEXSTATE. When there is an interrupt or an exception, RECOVERY pulls up the system state stored in PEXSTATE and restores it to the CURRENTEX- STATE via the multiplexer. Here, the PEXSTATE stores the state of the previous macroinstruction after execution or before a segment point, whereas the PEXSTATE is updated or is not updated depending on the control of the atomic bit data at the EX stage. The procedure is illustrated in FIG. 6.

Figure 6:
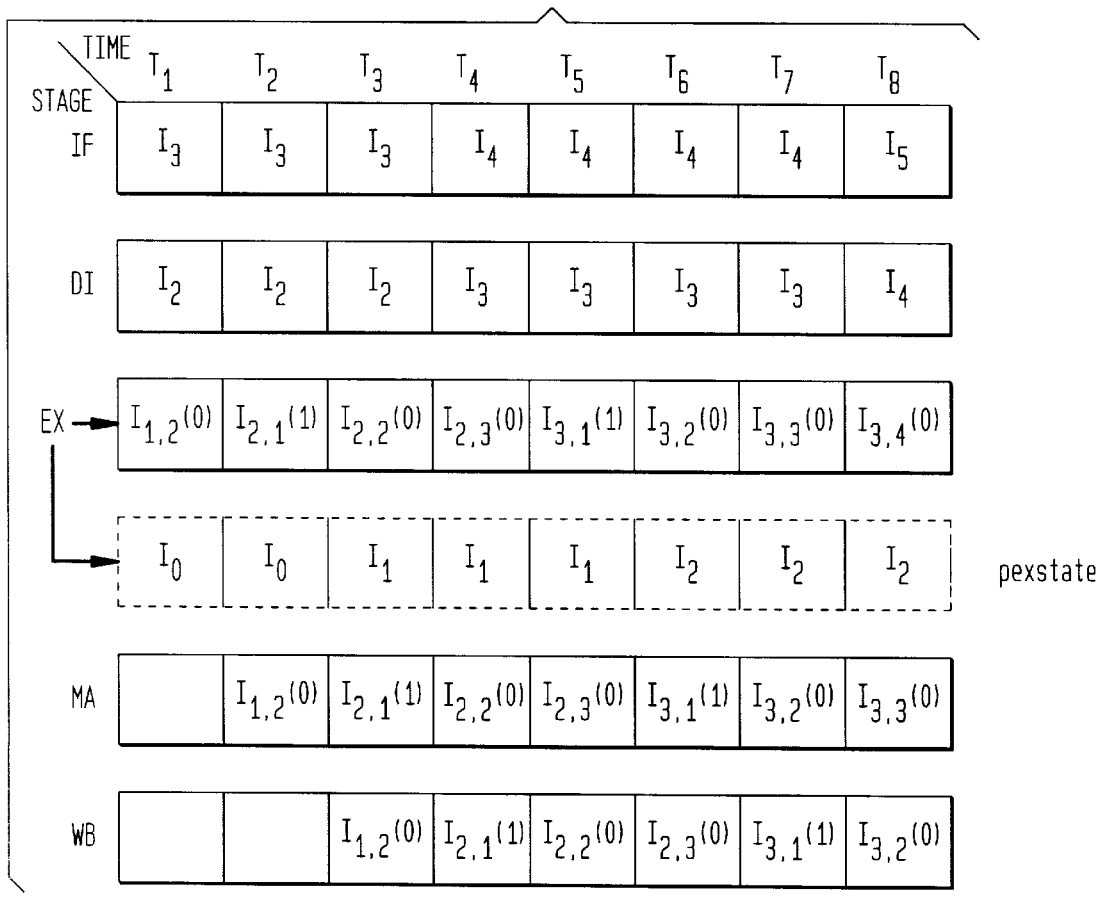
FIG. 6 illustrates a chart showing microinstruction and atomic bit data in relation to time/stage in accordance with the present invention.

FIG. 6 illustrates the situation when macroinstructions $I_0$, $I_1$, $I_2$, $I_3$, $I_4$, and $I_5$ pass through the various pipelined stages, where $I_1$ is translated into two microinstructions $I_{1,1}$, $I_{1,2}$; $I_2$ into three microinstructions $I_{2,1}$, $I_{2,2}$, $I_{2,3}$; and $I_3$ into four microinstructions $I_{3,1}$, $I_{3,2}$, $I_{3,3}$, $I_{3,4}$. The values in the brackets are the atomic bit definitions set by the microinstruction. The boxes in dotted lines below the EX stage contain the indications of the state of the PEXSTATE, stored in register 58, at the EX stage after the macroinstructions have been executed.

At $T_1$, $I_2$ is at the DI stage, and is decoded as $I_{2,1}$. At the same time, the atomic bit is defined as 1. At $T_2$, $I_{2,1}$ enters the EX stage, and the PEXSTATE is enabled at the same time so as to store the state of macroinstruction $I_1$ at $T_3$ after it has been executed. At $T_3$, the PEXSTATE updates the state to that of the $I_1$ after execution, $I_{2,2}$ enters the EX stage, and atomic bit is defined as 0 while PEXSTATE is disabled. If there is an interrupt or exception occurring at this moment, the control device of the processor will store the PC value of $I_2$ and issue a recovery signal simultaneously. The system state of $I_1$ stored in the PEXSTATE will be recovered at the next cycle. At $T_4$, the PEXSTATE maintains the state of the $I_1$ after execution, $I_{2,3}$ enters the EX stage, and the atomic bit is defined as 0 while the PEXSTATE is disabled. If there is an interrupt or exception occurring at this moment, then the system state of $I_1$, stored in the PEXSTATE, will be recovered at the next cycle. At $T_6$, the PEXSTATE updates the state to that of the $I_2$ after execution. If there is an interrupt or exception occurring at this moment, the control device of the processor will store the PC value of $I_3$ to indicate that it has passed the boundaries of $I_2$ and $I_3$. Other macroinstructions can also recover to the appropriate state using this rule when there occurs an interrupt or an exception. Similarly, the same recovery device can be used to apply to the segment points of macroinstructions.

Thus, it can be noted from the above description that the atomic bit data defines the boundary of the precise interrupt and that the system can utilize the atomic bit data to ascertain the execution situation of macroinstructions at various pipelined stages. Accordingly, the atomic bit data can be used to store the state of a previous macroinstruction after execution or before the segment point so that an interrupt or an exception can be processed even before the macroinstruction has completely passed through the pipelining process. Further, while the interrupt or the exception is being processed, the system state can be recovered to the state of the precise interrupt.

The application of the atomic bit data in processing an interrupt or an exception will now be described. Note, however, that the processing of an interrupt during a microinstruction will not be complete without the cooperation of the LOCK bit. The following will discuss the role the LOCK bit data in defining an interrupt prohibited zone.

Firstly, note that not all of the microinstructions of a macroinstruction will accept an interrupt and restore to the state of the precise interrupt boundary. In some situations, certain microinstructions will cause the system state to be unrecoverable if an interrupt is accepted, as shown in the pipelining process of macroinstruction I in FIG. 7.

In this example, FIG. 7($a$) illustrates the effect on registers 0–4 (not shown in FIG. 2) when macroinstruction $I_1$ is executed. The content of registers 0, 1, and 2 are moved to registers 2, 3 and 4 after $I_1$ is executed, while a copy of the content of the original registers 1 and 2 is made and stored in registers 0 and 1. FIG. 7($b$) illustrates the behavior of microinstructions $I_{1,1}$–$I_{1,5}$ when the macroinstruction is being executed. $I_{1,1}$ enters the pipelining stages first and $I_{1,5}$ enters last. $I_{1,1}$ first moves the content of register 2 to register 4, $I_{1,2}$ moves the content of register 1 to register 3, and the rest of the microinstructions behave the same way until macroinstruction $I_1$ is executed. FIG. 7($c$) illustrates the situation of $I_{1,1}$–$I_{1,5}$ during the pipelining process.

It should be noted first in this example that if there is no recovery device corresponding to writing in the register at the WB stage, when $I_{1,1}$–$I_{1,5}$ enters the WB stage, the system cannot be restored to the boundary state of the previous precise interrupt for the simple reason that the value of the register has been changed and there is no recovery device to undo it. The system state in this situation is called the unrecoverable state.

At $T_2$, microinstruction $I_{1,1}$ translated from macroinstruction $I_1$ enters the EX stage. At $T_2$, $T_3$, and $T_4$, $I_{1,1}$, $I_{1,2}$, and $I_{1,3}$ have already entered the WB stage. If there is an interrupt occurring at this moment, the processing of the interrupt must be delayed until the execution of macroinstruction is completed to ensure that the precise interrupt is operating normally. This is because the WB stage does not have a recovery device to restore the state before the execution of $I_1$. This example illustrates that an interrupt cannot be processed at any time.

Thus, when a microinstruction enters the pipelining stages of interrupt processing, in order to ensure a precise interrupt when an interrupt occurs, the system can either execute the macroinstruction to which the microinstruction belongs to its completion or until the next segment point. Further, the system can either restore the state of the macroinstruction to which the microinstruction belongs to its previous state before execution or to the state of the previous segment point. In the former case, the processing of the interrupt is delayed, in the latter case, the support of a recovery device is required.

As for the selection of the segment point of the macroinstruction, when the microinstructions are executed up to the segment point, the system must maintain the precise interrupt state. For instance, for repetitive multiple instructions to move the memory content, the microinstruction at the end of each memory move can be a segment point.

However, an interrupt cannot be accepted all the time when a macroinstruction is being executed:

1. Some system instructions themselves are of an uninterruptible nature;
2. The microinstructions of some macroinstructions are of an unrecoverable nature when the system state is being changed.

In the present invention, a further control bit, i.e. the LOCK bit data, is used to deal with the above-mentioned two situations. The LOCK bit data of each microinstruction is defined when the macroinstruction is decoded and it is processed by the processor control unit when the microinstruction is sent to the MA stage. When the LOCK bit is 1, it indicates that the external interrupt must be masked and the processing of the interrupt is delayed.

The function of the LOCK bit data is explained using the following example:

1. Macroinstruction $I_i$ is composed of a microinstruction group $I_{i,1}$–$I_{i,z}$, where $z \geq 1$, expressed as:

$$\{I_{i,k} | 1 \leq k \leq z, z \geq 1\}$$

2. As previously stated, the pipelined processor is assumed to have five pipelining stages, the first stage being the IF stage, the second, the DI stage, the third, the EX stage, the fourth, the MA stage, and the fifth, the WB stage. The interrupt processing mechanism is at the MA stage.

3. Some microinstructions will cause the system state to be unrecoverable when entering the MA stage or the WB stage, such as instructions to modify a register, to modify the system state, or to write in the memory. These microinstructions will be referred to as unrecoverable microinstructions.

4. When a macroinstruction has microinstructions described in 3, and the first of which microinstructions enters the MA stage or the WB stage, the system must begin masking the interrupt.

5. Some macroinstructions are of an uninterruptible nature by definition and the microinstructions of this kind of macroinstructions must mask the interrupt.

6. For macroinstructions that are translated into single microinstructions, the interrupt need not be masked except in the situation described in 5.

Figure 8:
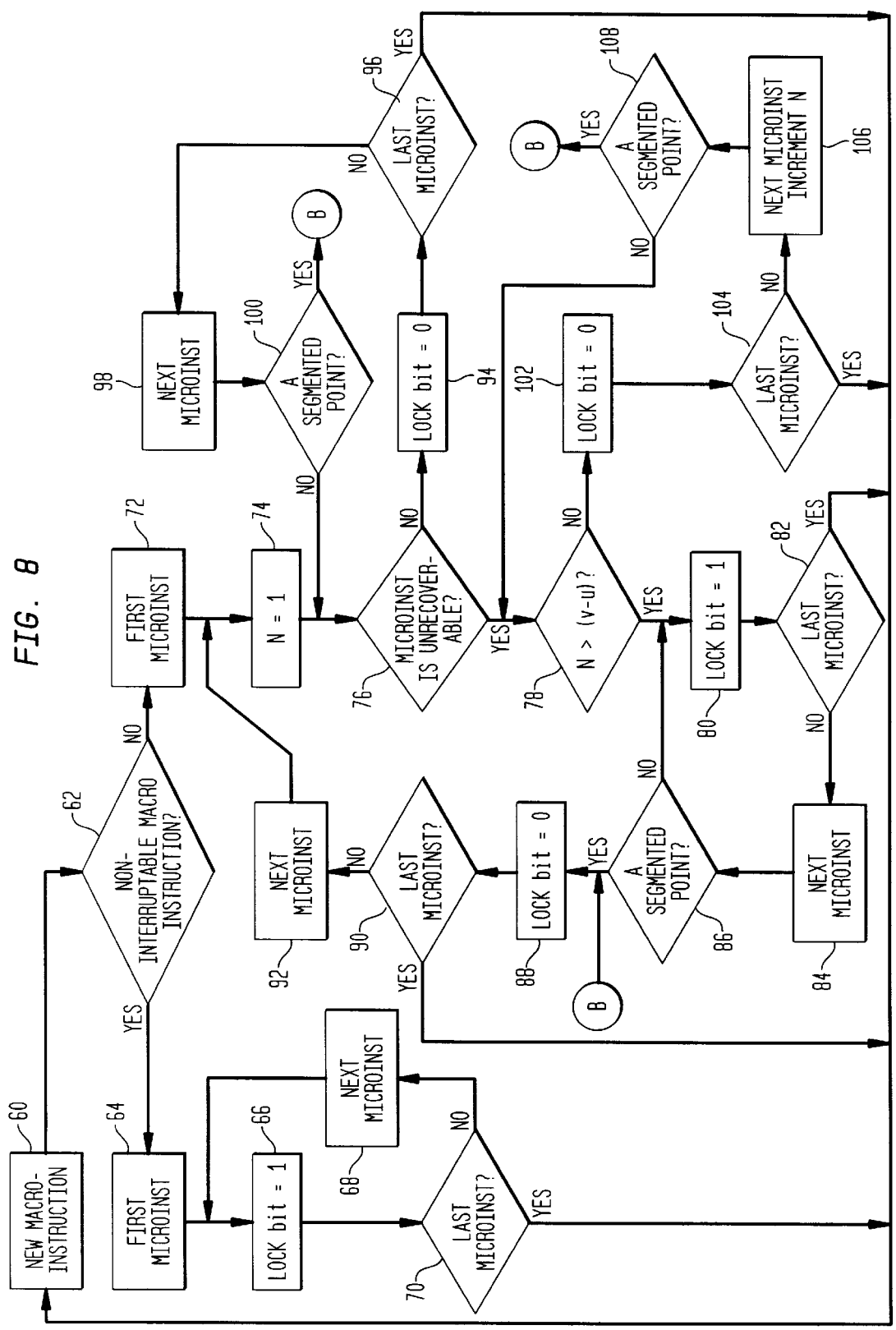
FIG. 8 is a flowchart defining the LOCK bit data in accordance with the present invention.

According to the above-mentioned rules, the LOCK bit of the microinstruction translated from the macroinstruction is defined in the process illustrated in the flowchart in FIG. 8, wherein v indicates the lowest level in the pipelining stage where a microinstruction may generate an unrecoverable state (for instance, when a microinstruction causes an unrecoverable state at the WB stage, v=5, and when a microinstruction causes an unrecoverable state at the MA stage, v=4), and u indicates the pipelining stage where the interrupt processing happens (in the present example, the processing of the interrupt or exception occurs at the MA stage, therefore, u=4).

In Step 60, the macroinstruction will first determine if it is an uninterruptible macroinstruction. If it is, then the LOCK bit for all its microinstructions is defined as 1 as shown in Step 66. If it is not, then it is necessary then to check if a particular microinstruction is an unrecoverable microinstruction at Step 76, which may cause an unrecoverable state at the MA stage or at the WB stage. In the case of the former situation, v=4, while in the case of the latter, v=5, as shown in FIG. 8. If the microinstruction is not unrecoverable, the LOCK bit is set to 0 at Step 94, which means that the state that this microinstruction changes can be recovered while an interrupt is being processed. Thus, it is not necessary to delay the processing of the interrupt or exception. Subsequently, the next microinstruction is checked at Step 96, if it is not the last microinstruction as determined in Step 104.

When checking for the first unrecoverable microinstruction during the macroinstruction translation as Step 76, it is assumed that the unrecoverable microinstruction has to reach the pipelining stage $P_i$ in the pipelining process before the system will cause an unrecoverable state. If the microinstruction has not reached $P_i$, an interrupt can be processed at any time. In FIG. 8, (v−u) represents the difference between the level in the pipelining stages where the first irrecoverable microinstruction may cause an unrecoverable state and the level of interrupt processing in the pipelining stages. At Step 78, when the first unrecoverable microinstruction is in the pipelining stages between the two levels, the processing of interrupts is permitted, at Step 102, since an irrecoverable state will not occur. When the first unrecoverable microinstruction causes an unrecoverable state the processing of interrupts must be delayed at Step 80, such that LOCK bit=1. In other words, when this microinstruction reaches $P_i$, namely, at the MA stage, the LOCK bits of the microinstructions at the EX stage and of those translated from thereafter must all be set to 1, to mask the interrupt.

When translating a new microinstruction, it is also necessary to determine if this particular microinstruction is a segment point, at Steps 86, 100 and 108, and if it allows interrupt processing at the segment point. If a microinstruction is at a segment point, the LOCK bit is set to 0 at Steps 88 & 94.

Referring back to FIG. 7(c), for instruction $I_1$, when the first microinstruction $I_{1,1}$ enters the WB stage, it may cause an unrecoverable state but it only actually causes an unrecoverable system state at $T_4$; at $T_3$, $I_{1,1}$ has not entered the WB stage so that it is still possible to process an interrupt. The LOCK bit is set to 0 since the microinstruction at the MA stage is $I_{1,1}$. However, at $T_4$, $I_{1,1}$ starts to cause an unrecoverable state and it is necessary to delay the processing of the interrupt until the whole macroinstruction passes through the MA stage or until the segment point reaches the MA stage. Thus, the LOCK bit of $I_{1,2}$ must be set to 1 in order to mask any external interrupt at $T_4$. For the same reason, the LOCK bit of the subsequent microinstructions $I_{1,3}$, $I_{1,4}$ and $I_{1,5}$ must also be set to 1, and an interrupt will not be processed until $T_8$.

Thus, the definition of the LOCK bit data of the microinstruction also defines the prohibited zone for interrupts. The microinstructions translated from a macroinstruction may contain segment points at which an interrupt can be processed. When an interrupt is being processed at a segment point, the condition must comply with the requirement of the precise interrupt, otherwise the segment point is not valid. When the first microinstruction starts to cause an unrecoverable state, the interrupt starts to refuse processing until the whole macroinstruction is finished or until a segment point is reached. With the consideration of the recoverability of the system state and of the definition of the segment point, the LOCK bit has narrowed the interrupt prohibited zone from the whole execution period of the macroinstruction in the pipelining stages to between the time the macroinstruction starts to cause the unrecoverable state and the time the execution of the macroinstruction is completed or the position when a segment point is reached. As a result, there is now more time to process an interrupt and further, it takes less time to start to process an interrupt after it occurs.

The following example will illustrate the operation of the LOCK bit in the processing of an interrupt or exception, the interrupt being the fault type.

Let us assume in the example that a flag register is located at the EX stage and the processor includes a corresponding recovery device which may utilize the atomic bit data, the operation of which has been previously described. The interrupt processing mechanism is located at the MA stage, namely, the fourth stage in the pipelining process. In FIG. 8, let u=4. Therefore, when processing the interrupt, the processor control unit will flush the appropriate pipelining stage, and store the PC value of the macroinstruction to which the current microinstruction at the MA stage belongs. It then executes the interrupt service routine and implements the macroinstruction whose PC value has been just stored when the interrupt service routine is finished.

Figure 9:
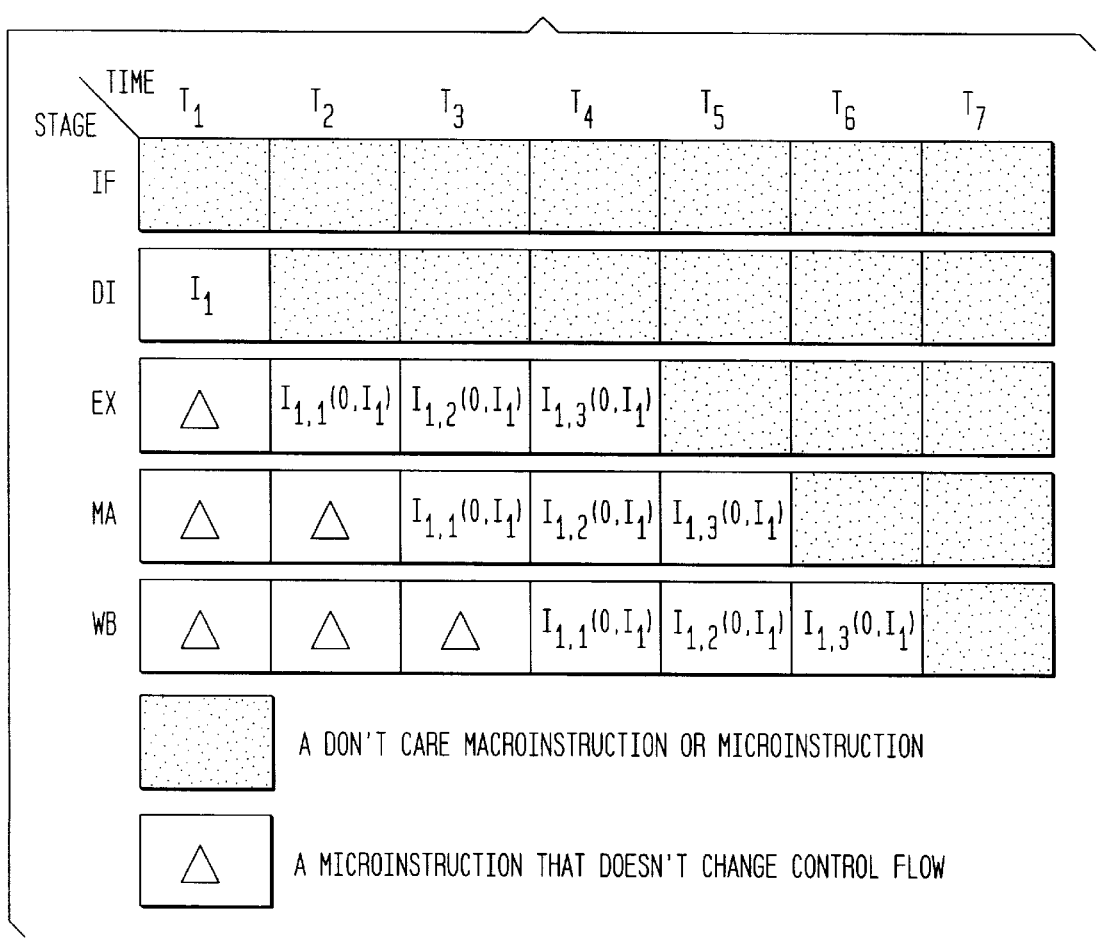
FIG. 9(a) illustrates the function of three recoverable microinstructions translated from a corresponding macroinstruction in accordance with the present invention.
FIG. 9(b) illustrates a chart showing the microinstruction and LOCK data of FIG. 9(a) in relation to time/stage in accordance with the present invention.

FIG. 9 illustrates the operation when all the microinstructions translated from macroinstruction $I_1$ are recoverable. FIG. 9(a) describes the functions of the three microinstructions translated from macroinstruction $I_1$, whereas FIG. 9(b) illustrates the execution process of each microinstruction at various pipelining stages. $I_{1,1}$, $I_{1,2}$, and $I_{1,3}$ are instructions to clear the flag register and will not cause an unrecoverable state. In FIG. 9(b), the first number within the bracket indicates the LOCK bit set by the microinstruction, and the second number indicates the macroinstruction to which the microinstruction corresponds. At $T_2$, $I_{1,1}$ enters the EX stage, and the LOCK bit is set to 0 according to the flowchart described in FIG. 8, as this microinstruction is recoverable. Thus, at $T_3$, the interrupt is not masked since the LOCK bit of $I_{1,1}$ is set to 0. If there occurs an interrupt, it will be processed right away. At the same time, since the PC value of $I_1$ is stored, the system is restored to the state before the macroinstruction is executed and the interrupt service routine is executed. Similarly, the LOCK bit of $I_{1,2}$ and $I_{1,3}$ are both set to 0, according the flowchart described in FIG. 8. When an interrupt occurs at $T_4$ or $T_5$, the system state will be restored to that state prior to the execution of the macroinstruction.

Figure 10:
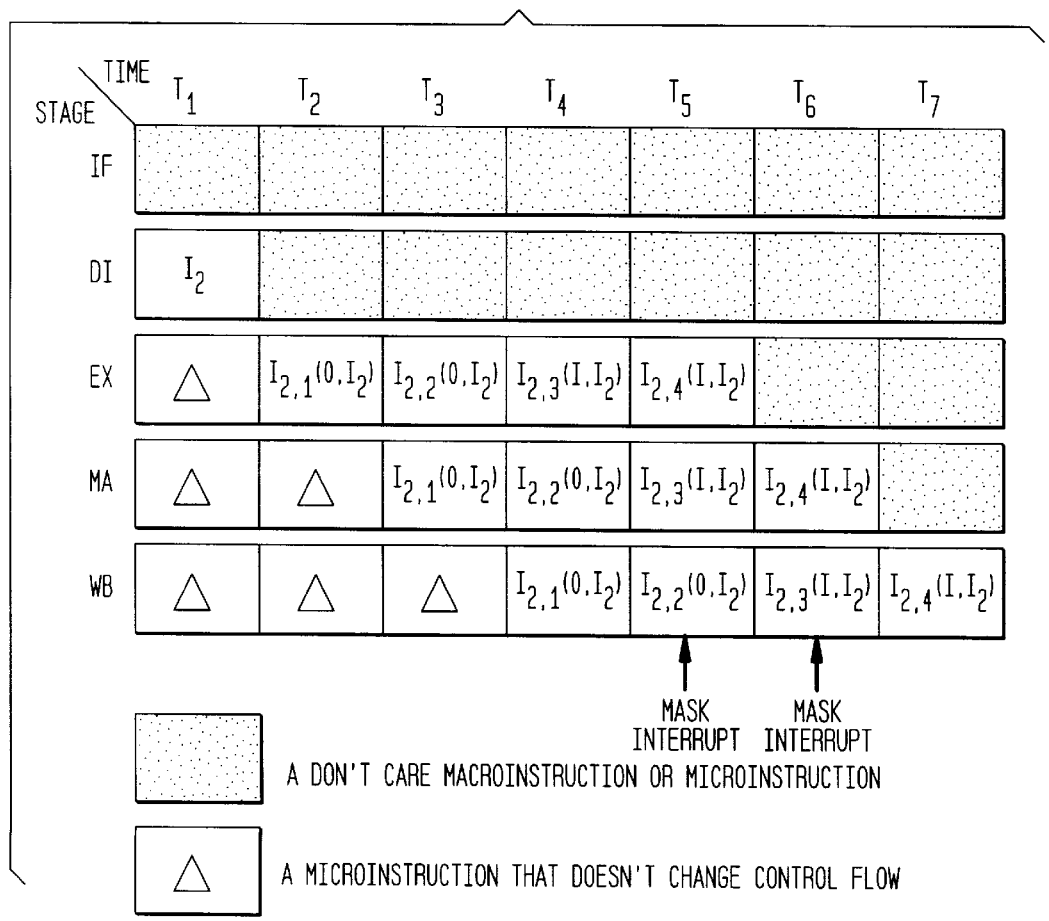
FIG. 10(a) illustrates the function of four microinstructions, some unrecoverable, translated from a corresponding macroinstruction in accordance with the present invention.
FIG 10(b) illustrates a chart showing microinstruction and LOCK bit data of FIG. 10(a) in relation to time/stage in accordance with the present invention.

FIG. 10 describes the four microinstructions of macroinstruction $I_2$. Some of these microinstructions will cause an unrecoverable system state. FIG. 10(a) describes the function of the four microinstructions. The function of $I_{2,1}$ is to clear the flag register and it is a recoverable microinstruction. The functions of $I_{2,2}$, $I_{2,3}$ and $I_{2,4}$ are to move the content of the register in general and they will cause an unrecoverable state when they enter the WB stage. Therefore, when $I_{2,2}$, $I_{2,3}$ and $I_{2,4}$ are confirmed to be unrecoverable instructions, v=5, according to the explanation in FIG. 8. FIG. 10(b) illustrates the execution process of the microinstruction at various pipelining stages. $I_{2,1}$ is a recoverable instruction; it enters the EX stage at $T_2$ and its LOCK bit is set to 0. It allows an interrupt to be processed right away at $T_3$. $I_{2,2}$ is an unrecoverable instruction in relation to the WB stage. Thus, v=5 and it will only change the system state when it reaches the WB stage. Thus, at $T_4$, when $I_{2,2}$ is at the MA stage it will not cause an unrecoverable system state and will allow an interrupt to be processed. The LOCK bit of $I_{2,2}$ is therefore set to 0. At $T_4$, if there is an interrupt occurring, the system can process it right away. The system will first restore the state to that before the execution of $I_2$ and store the PC value of $I_2$. At $T_5$, since $I_{2,2}$ is already at the WB stage and has changed the system state so that is not recoverable, an interrupt, if it occurs, cannot be processed right away but must wait until the last microinstruction of the macroinstruction has passed the MA stage. In other words, if an interrupt occurs at $T_5$ or $T_6$, it cannot be processed until the last microinstruction of $I_2$, namely, $I_{2,4}$ has reached the WB stage (at $T_7$). Thus, the LOCK bits of $I_{2,3}$ and $I_{2,4}$ are set to 1 and the interrupt processing is not allowed at $T_5$ and $T_6$.

Figure 11:
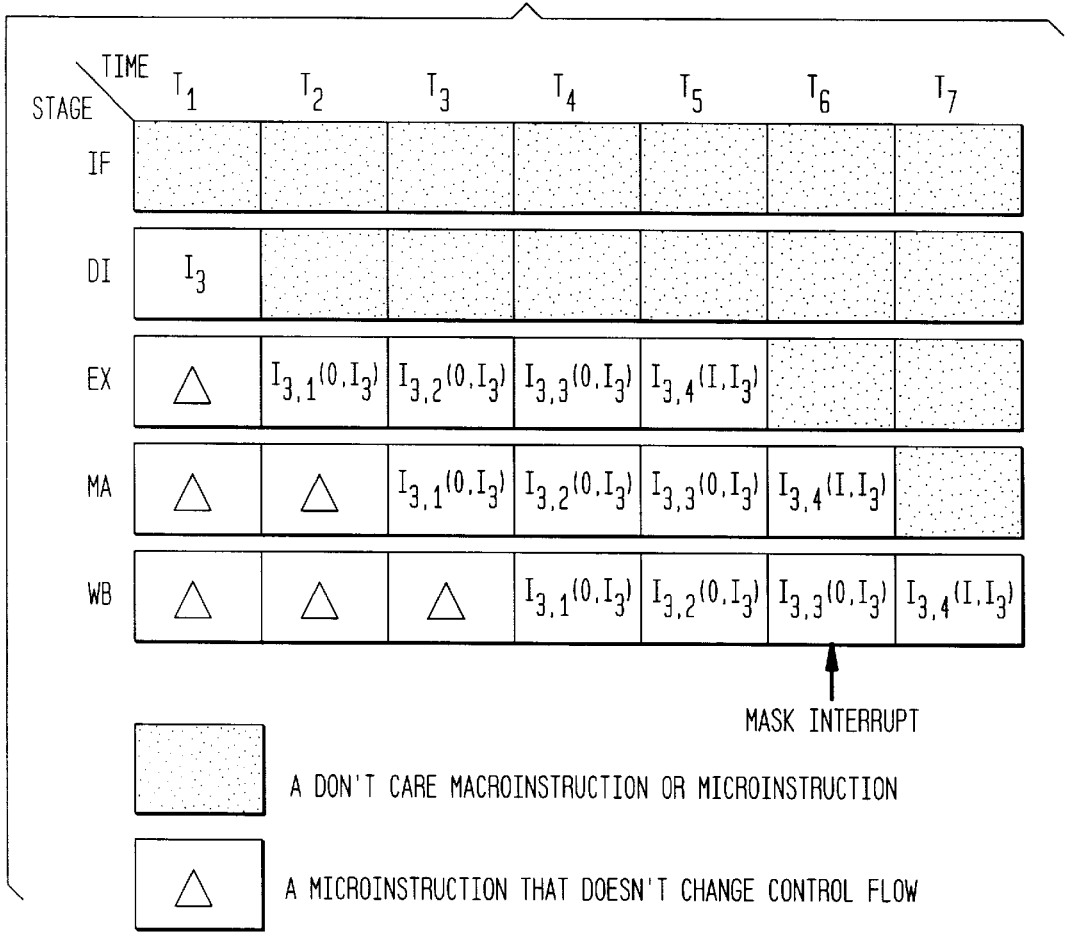
FIG. 11(a) illustrates the function of four microinstructions, some recoverable and some unrecoverable, translated from a corresponding macroinstruction in accordance with the present invention.
FIG. 11(b) illustrates a chart showing microinstruction and LOCK bit data of FIG. 11(a) in relation to time/stage in accordance with the present invention.

FIG. 11 illustrates the execution of the macroinstruction composed of recoverable and unrecoverable microinstructions and of microinstructions that detect exceptions. Macroinstruction $I_3$ is translated into four microinstructions $I_{3,1}$, $I_{3,2}$, $I_{3,3}$ and $I_{3,4}$ whose properties and functions are illustrated in FIG. 11(a). The function of $I_{3,1}$ is to clear the flag register and will not cause an unrecoverable system state, while the function of $I_{3,2}$ is to detect exceptions. Since it will not cause an unrecoverable system state, it is considered a recoverable microinstruction. $I_{3,3}$ and $I_{3,4}$ can access the registers and will cause an unrecoverable system state when entering the WB stage. $I_{3,1}$ and $I_{3,2}$ enter the EX stage at $T_2$ and $T_3$ respectively. Since $I_{3,1}$ and $I_{3,2}$ are recoverable microinstructions, their LOCK bits are set to 0. At time $T_3$ or $T_4$, instruction $I_{3,1}$ or $I_{3,2}$ respectively enters the MA stage. Since the system state is recoverable, an interrupt is allowed to be processed. At $T_4$, $I_{3,2}$ processes an exception, if any, detected at the MA stage, stores the PC value for $I_3$, and the system state is recovered to that state prior to the execution of $I_3$. At $T_5$, the system is still recoverable and allows the processing of an interrupt since the first unrecoverable microinstruction $I_{3,3}$ enters the MA stage. At $T_6$, $I_{3,3}$ enters the WB stage, causes an unrecoverable state and does not allow the processing of any interrupt. The LOCK bit of $I_{3,4}$ is set to 1 to mask the interrupt and delay the processing of the interrupt. At $T_7$, all the microinstructions of $I_3$ have passed the MA stage. If an interrupt occurs at this moment, the stored PC value will be the next macroinstruction and the system is in the state of completion of the execution of $I_3$. All this meets the requirement of the precise interrupt.

Thus, the use of the atomic bit provides the boundary of the system's precise interrupt. This boundary can be the first microinstruction of the macroinstruction or the segment point of the macroinstruction. When the processing of the interrupt requires the boundary information, the atomic bit data will provide it by storing, for instance, the system state before the macroinstruction is executed and before the segment point of the macroinstruction. When the processing of the interrupt needs to maintain the precise interrupt again, the stored state can be recovered without having to delay the processing until the completion of the macroinstruction. The LOCK bit data provides the information to define an interrupt prohibited zone when a macroinstruction is being translated into microinstructions. The programmer of microinstructions can use the LOCK bit data to determine when to mask an interrupt during the execution of a macroinstruction, which creates greater flexibility for the processing of interrupts. To maintain the precise interrupt, the LOCK bit data of the microinstructions is defined according to the flowchart in FIG. 8. To process an interrupt, the system must be in the state of either before or after the execution of the macroinstruction to which the interrupted microinstruction belongs, or before or after the segment point of the interrupted microinstruction. Before the system state become unrecoverable, any interrupt can be processed right away and the system state can be restored to the boundary of the previous precise interrupt using the atomic bit data described hereinbefore. If a microinstruction has already caused the system to be unrecoverable, the processing of the interrupt must be delayed until the boundary of the following precise interrupt. The use of the LOCK bit data at this time can make the system more flexible in the sense that the system can, for instance, accept the processing of interrupts any time when it is still recoverable, thus creating an expanded time frame within which to process interrupts, thus shortening the time it takes to process an interrupt after it occurs.

Figure 12:
FIG. 12(a) illustrates the function of four microinstructions, some recoverable and some unrecoverable, translated from a corresponding macroinstruction in accordance with the present invention.
FIG. 12(b) illustrates a chart showing microinstruction, atomic bit data and LOCK bit data of FIG. 12(a) in relation to time/stage in accordance with the present invention.

FIG. 12 illustrates a method of defining both the atomic bit and the LOCK bit for each translated microinstruction and the way these two control bits operate together. As shown in the previous example, a five stage pipelined data processor is assumed where the EX stage implements the system recovery device, as shown in FIG. 5 and the MA stage implements the interrupt processing mechanism. When the LOCK bit of the microinstruction at the MA stage is set to 1, no interrupt is allowed to be processed. The PC value of the macroinstruction to which the microinstruction at the MA stage belongs will be stored during the interrupt processing and a recovery signal will be issued to the state recovery device, shown in FIG. 5, to recover the state.

FIG. 12(a) describes macroinstruction $I_4$ being translated into microinstructions. $I_{4,1}$ and $I_{4,2}$ are both recoverable microinstructions, while $I_{4,3}$ and $I_{4,4}$ will cause an unrecoverable state when they reach the WB stage. FIG. 12(b) illustrates the execution process of the microinstructions of macroinstructions $I_3$, $I_4$, $I_5$ and $I_6$ in the pipeline. FIG. 12(b) also shows the operation of the last microinstruction $I_{3,4}$ of macroinstruction $I_3$ and the first two microinstructions $I_{5,1}$ and $I_{5,2}$ of macroinstruction $I_5$ in the pipeline. The dotted line box below the EX stage in FIG. 12(b) contains the state after the execution of the macroinstruction stored in PEXSTATE by the storage device at the EX stage. The first number in the bracket after the microinstruction indicates the atomic bit value set for the microinstruction and the second number indicates the LOCK bit value set for the microinstruction and the third number indicates the macroinstruction to which the microinstruction corresponds.

At $T_2$, microinstruction $I_{4,1}$ enters the EX stage, the atomic bit and the LOCK bit are set to 1 and 0, respectively, according to the flowchart in FIG. 8. The atomic bit value 1 enables the PEXSTATE storage device at the EX stage. At $T_3$, microinstruction $I_{4,2}$ enters the EX stage and the atomic bit and the LOCK bit are both set to 0, according to the flowchart in FIG. 8. The atomic bit value 0 disables the PEXSTATE and the content of the PEXSTATE is updated to reflect the state of completion of the execution of macroinstruction $I_3$. At the same time, $I_{4,1}$ enters the MA stage. Since the LOCK bit data is set to 0, an interrupt is allowed to be processed. If an interrupt does occur, the interrupt processing mechanism will process it immediately: the PC value of $I_4$ will be stored, and RECOVERY is set to 1 to restore CURRENTEXSTATE to the PEXSTATE which has stored the state of the executed $I_3$. Thus, the requirement of the precise interrupt is satisfied.

At $T_4$, microinstruction $I_{4,3}$ enters the EX stage, the atomic bit and the LOCK bit are both set to 0, according to the flowchart in FIG. 8. The atomic bit value of 0 disables the PEXSTATE at the EX stage which maintains the state of completion of the executed macroinstruction $I_3$. When $I_{4,2}$ enters the MA state, the LOCK bit is set to 0 and interrupt processing is allowed. When an interrupt occurs and is being processed, because the system is recoverable, the PC value of $I_4$ is stored, and RECOVERY is set to 1 to restore the CURRENTEXSTATE to the PEXSTATE which has stored the state of the executed $I_3$. Thus, the requirement of the precise interrupt is satisfied. At $T_5$, $I_{4,4}$ enters the EX stage, and because the system is recoverable, an interrupt is allowed to be processed. If necessary, the system can be restored to the state of completion of the executed $I_3$.

At $T_6$, microinstruction $I_{5,1}$ enters the EX stage, the atomic bit is set to 1 to enable PEXSTATE, and microinstruction $I_{4,3}$ enters the WB stage and changes the system state to be unrecoverable. Further, microinstruction $I_{4,4}$ enters the MA stage with its LOCK bit set to 1 to prevent any interrupt from being processed. At $T_7$, the last microinstruction $I_{4,4}$, translated from macroinstruction $I_4$, enters the WB stage, while the PEXSTATE is updated to reflect the state of completion of the execution of $I_{4,4}$, which refers to the state of completion of the execution of macroinstruction $I_4$. If an interrupt has to be processed, the PC value of $I_5$ will be stored, and the system will be restored to the state of completion of the executed $I_4$. Thus, the requirement of the precise interrupt is satisfied.

From the above discussion about the method to define an interrupt prohibited zone in the process of translating a macroinstruction into microinstructions, it can be noted that the atomic bit data and the LOCK bit data can be utilized in controlling the interrupt processing of microinstructions. When the system utilizes the atomic bit data to acquire the knowledge of the boundary of the precise interrupt and the LOCK bit data to control when not to allow interrupts, the control of interrupt processing in a pipelined data processor is made more comprehensive and more flexible. The advantages are, among other things, a reduction of time it takes to process an interrupt after it occurs, and an increase in time there is to process an interrupt.

Figure 13:
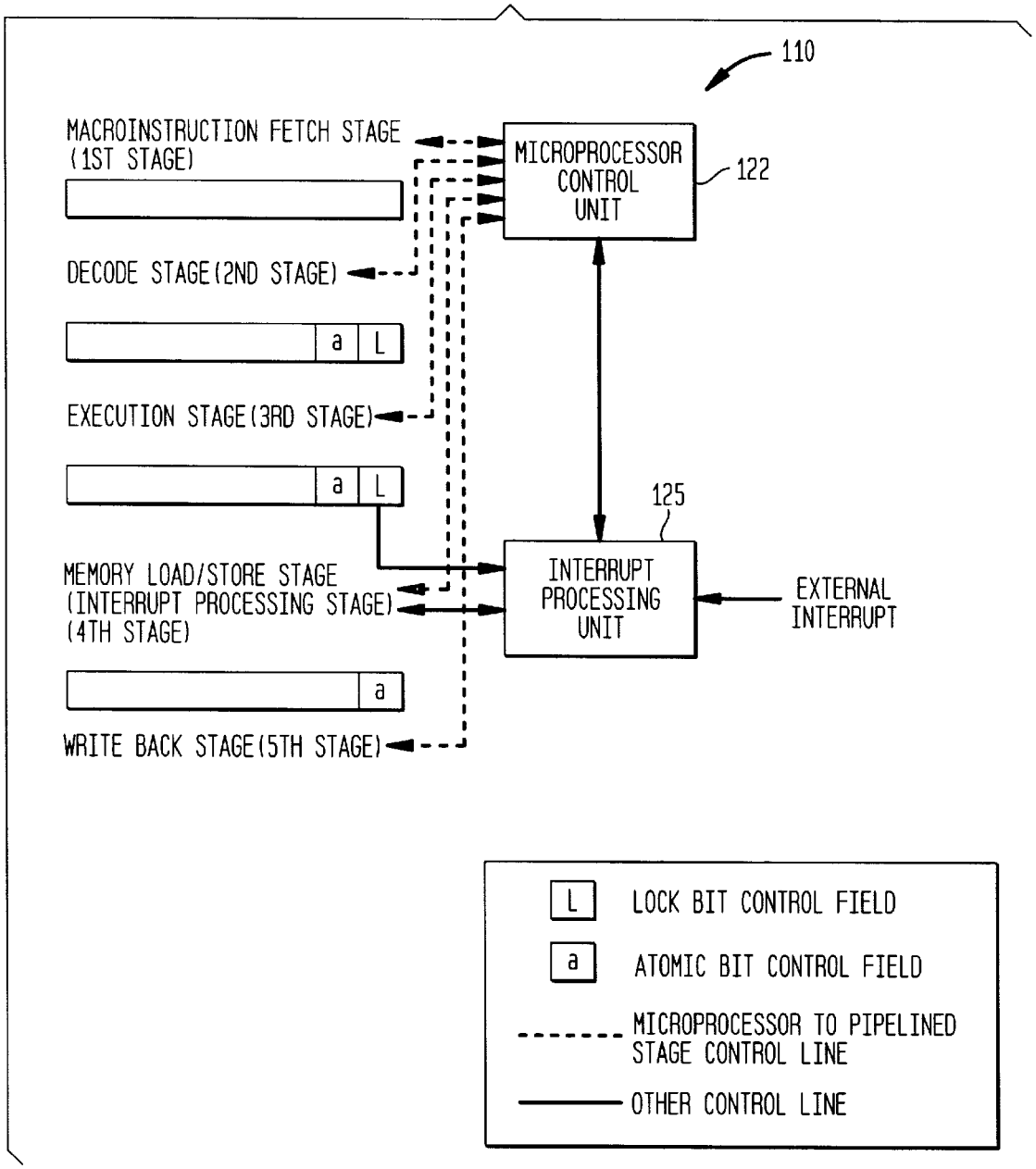
FIG. 13 schematically illustrates a 5 stage pipeline processor in accordance with the present invention.

FIG. 13 schematically illustrates a 5 stage pipeline processor 110 according to the present invention. Note that pipeline processor 110 includes a microprocessor control unit 122 (similar to control unit 22 of FIG. 2) and an interrupt processing unit 125, connected thereto, for receiving external interrupts. As previously described, atomic bit data is selectively supplied at the DI, EX and MA (the interrupt processing stage) stages, while LOCK bit data is selectively supplied at the DI and EX stages.

Figure 14:
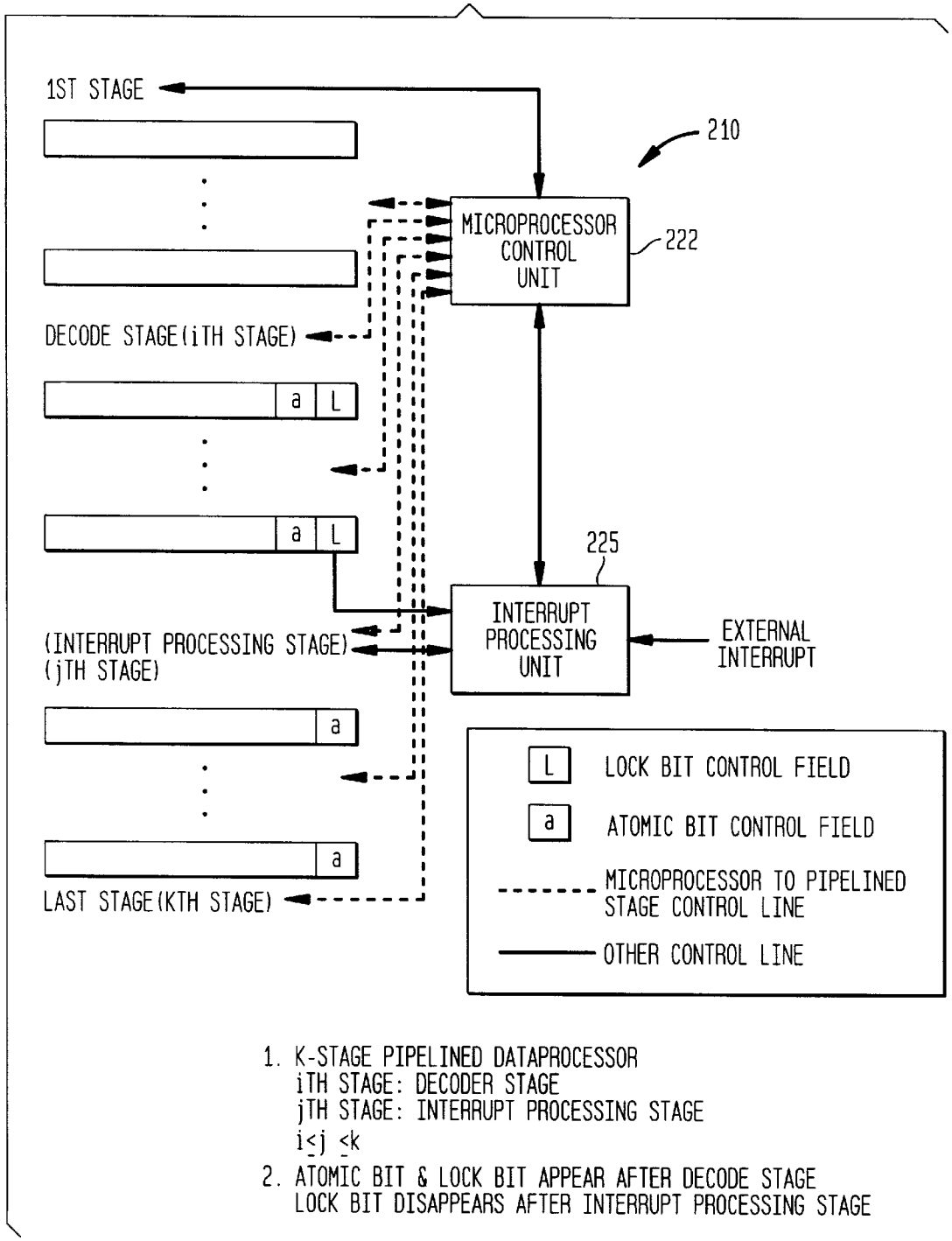
FIG. 14 schematically illustrates a generic multistage processor in accordance with the present invention.

FIG. 14 schematically illustrates a generic multistage processor 210 accordingly to the present invention. As with processor 110, pipeline processor 210 includes a microprocessor control unit 222 and an interrupt processing unit 225 for receiving external interrupts. There are K number of stages, where the ith stage is the decoder stage and the jth stage is the interrupt processing (memory access) stage, such that $i \leq j \leq k$.

Finally, note that the above discussion is just a preferred embodiment of the invention and is only provided as a description of the invention. The same method can not only be used in a five stage pipelined data processor used in the example but also be extended to a pipelined data processor with any other number of stages. Furthermore, the interrupt processing mechanism does not have to be implemented at the MA stage, any other stage works just as well. There are other approaches and techniques that can be used in the spirit and concept of the present invention to design a method of defining the interrupt prohibited zone for a pipelined data processor.

What is claimed is:

1. A method of processing at least one precise interrupt within an executable macroinstruction upon the occurrence of an internal exception or an external interrupt, said macroinstruction including a plural of microinstructions, comprising the steps of:

a) decoding said macroinstruction into said plural of microinstructions;

b) selectively providing a first control bit representing precise interrupt boundary information;

c) selectively providing a second control bit representing specific points between said plural of microinstructions that will inhibit an interrupt;

d) executing said microinstructions;

e) upon the occurrence of an exception or interrupt, determining whether the process is in a reversible or an unrecoverable state, based on said first and second control bits;

f) selectively immediately processing said exception or interrupt if said process is in said reversible state, and returning said process to said precise interrupt boundary of the last executed microinstruction, based on said first and second control bits; and g) selectively delaying said processing of said interrupt if said process is in said unrecoverable state until a next precise interrupt boundary occurs, based on said first and second control bits.

2. The method of claim 1, wherein said first control bit is an atomic bit, and said second control bit is a LOCK bit.

3. The method of claim 1, wherein said precise interrupt boundary information includes the beginning address of a first microinstruction in each corresponding macroinstntetion, segment point of each macroinstruction, and the state of said boundary information.

4. The method of claim 1, wherein said process further includes an instruction fetch stage, a memory access stage and a write back stage.

5. A pipeline data processor for processing at least one precise interrupt within an executable macroinstruction upon the occurrence of an internal exception or an external interrupt, said macroinstruction including a plural of microinstructions, comprising;
   a) a decoder for decoding said macroinstruction into said plural of microinstructions;
   b) a control unit for selectively providing a first control bit representing precise interrupt boundary information, for selectively providing a second control bit representing specific points between said plural of microinstructions that will inhibit an interrupt, and for determining whether the process is in a reversible or an unrecoverable state, based on said first and second control bits, upon the occurrence of an exception or interrupt;
   c) an execution engine for executing said microinstructions; wherein said control unit further selectively immediately processes said exception or interrupt if said process is in said reversible state, and returns said process to said precise interrupt boundary of the last executed microinstruction, based on said first and second control bits; and wherein said control unit further selectively delays said processing of said interrupt if said process is in said unrecoverable state until a next precise interrupt boundary occurs, based on said first and second control bits.

6. The processor of claim 5, wherein said first control bit is an atomic bit, and said second control bit is a LOCK bit.

7. The processor of claim 5, wherein said precise interrupt boundary information includes the beginning address of a first microinstruction in each corresponding macroinstruction, segment point of each macroinstruction, and the state of said boundary information.

8. The processor of claim 5, further including a macroinstruction fetch, a memory load/store, and a register file.

* * * * *